United States Patent [19]

MacNamee

[11] Patent Number: 4,522,737
[45] Date of Patent: Jun. 11, 1985

[54] ELECTROLYTES FOR ELECTROLYTIC CAPACITORS

[75] Inventor: Richard W. MacNamee, Pickens, S.C.

[73] Assignee: Sangamo Weston, Inc., Norcross, Ga.

[21] Appl. No.: 521,305

[22] Filed: Aug. 8, 1983

[51] Int. Cl.³ .............................................. H01G 9/00
[52] U.S. Cl. .................................... 252/62.2; 361/433; 252/500
[58] Field of Search ................ 252/500, 62.2; 361/433

[56] References Cited

U.S. PATENT DOCUMENTS

| 2,749,487 | 6/1956 | Jenny et al. | 317/230 |
|---|---|---|---|
| 3,138,746 | 6/1964 | Burger et al. | 317/230 |
| 3,302,071 | 1/1967 | Stahr | 317/230 |
| 3,346,782 | 10/1967 | Alwitt et al. | 317/230 |
| 3,547,423 | 12/1970 | Jenny et al. | 317/230 |
| 3,767,541 | 10/1973 | Curtis | 204/56 R |
| 3,812,039 | 5/1974 | Niwa | 252/62.2 |
| 4,373,177 | 2/1983 | Finkelstein et al. | 361/433 A |
| 4,376,713 | 3/1983 | Dunkl | 252/62.2 |

FOREIGN PATENT DOCUMENTS

| 694253 | 9/1964 | Canada | 252/63 |
|---|---|---|---|
| 47-29424 | 8/1972 | Japan . | |
| 2041646A | 9/1980 | United Kingdom . | |

Primary Examiner—Josephine L. Barr
Attorney, Agent, or Firm—Dale Gaudier

[57] ABSTRACT

An electrolyte for electrolytic capacitors comprises an alkyl glycol of 2 to 4 carbons; ammonium formate; and either a dicarboxylic acid of 2 to 8 carbons or its diammonium salt, wherein the ammonium ion is of the formula NH—(R)$_3$ in which R is H, or alkyl or alkanol of 1 to 7 carbons.

11 Claims, No Drawings

ELECTROLYTES FOR ELECTROLYTIC CAPACITORS

FIELD OF THE INVENTION

This invention relates to electrolytes for aluminum electrolytic capacitors.

BACKGROUND ART

Aluminum electrolytic capacitors typically include at least one pair of aluminum foil electrodes, etched to increase surface area, and having a surface dielectric oxide layer. The foil electrodes are usually separated by an insulating dielectric spacer material. Typical dielectrics include paper, plastic films, glass cloth, cellulose, perforated Teflon ® or other material that is inert in the electrochemical system. The aluminum foil electrodes and spacers are conventionally rolled into a cylinder that is impregnated with an electrolyte solution, and then this assembly is placed within a container and sealed. This basic electrode structure is known in the art; representative U.S. Patents with figures illustrating such an electrolytic capacitor include U.S. Pat. No. 3,302,071 (FIG. 1) and No. 3,346,782 (FIG. 1).

The function of the electrolyte is to connect the anode and the cathode, both of which have high surface areas and must be kept separated by the dielectric spacer material. The inherent resistance of the electrolyte adds to the resistance of the aluminum electrodes and the resistance of the aluminum oxide dielectric layers. Total resistance for the capacitor is called the equivalent series resistance (ESR), and the electrolyte resistance is a major contributor to the ESR. Optimally, the resistance of the capacitor will be low; unfortunately, however, most of the electrolyte materials which impart high conductivity are inimical to the aluminum oxide dielectric layer on the foil. This causes the capacitance of the aluminum electrolytic capacitor to degrade rapidly.

Thus, a high ESR is disadvantageous to a capacitor. Because the resistance of the dielectric layer and the aluminum electrodes are fixed by the capacitance desired and the requirements of the circuit design, only through modification of the electrolyte can the ESR be decreased.

The resistance of the electrolyte is controlled by three factors. The first is the number of ions dissolved in the electrolyte's solvent. More ions permit greater charge to be transferred in a given amount of time. It is possible for other ions, or ions and the solvent, to form associations which reduce the effective number of ions available to carry charge. Generally, as the solution approaches saturation with respect to a given ion, more ions are associated and fewer are available to carry charge. Thus, the selection of the concentration of the solute is critical; and it generally is made empirically.

The second factor is the mobility of the ions. The mobility is greatly affected by the viscosity of the solvent. Unfortunately, criteria other than viscosity, such as the toxicity of dimethyl formamide, for example, usually govern the selection of a solvent. Regardless of a particular solvent's viscosity, however, smaller ions are normally able to move through it at greater rates.

The third factor is the quantity of charge carried by each ion. Generally, multi-charged ions provide for a more conductive electrolyte.

An ideal electrolyte, therefore, will have many ions with a high charge-to-volume ratio in a low viscosity solvent.

A common electrolyte for aluminum electrolytic capacitors is the borate-glycol system, as discussed in U.S. Pat. No. 4,376,713. However, such electrolytes are disadvantageous in a number of respects, particularly as they are unsuitable for working at temperatures above 85° C. or below −40° C., or at voltages below 25 volts, as further discussed in Canadian Patent No. 694,253. Capacitors typically are required to function over relatively long time periods and over wide temperature ranges while maintaining a reasonably constant capacitance and impedance. Thus, any corrosion of the aluminum oxide layer of an electrode is particularly evident when capacitors are utilized continuously or at elevated temperatures. Various other electrolyte compositions have been proposed in an attempt to increase capacitor life and operating characteristics.

U.S. Pat. No. 3,138,746, for example, discloses a non-corrosive electrolyte for an electrolytic capacitor. The electrolyte includes an ionogen, for example, formic acid that is neutralized or partially neutralized with ammonia (or an amine) to yield, for example, ammonium formate. This ionogen is dissolved in a suitable solvent such as ethylene glycol. The electrolyte additionally includes one or more anion species of the type utilized in the formation of oxide films on the metal electrodes, such as ammonium borate, or certain phosphates or phosphites.

U.S. Pat. No. 3,346,782 discloses a nonaqueous solvent and an ammonium salt of the formula $R_1COONH_2R_2R_3$ wherein $R_1$, $R_2$ and $R_3$ are selected from the group consisting of hydrogen, straight, branched, substituted, unsubstituted, saturated and unsaturated C1–C7 alkyl groups and mixtures thereof; for example, ammonium formate, ammonium acetate, and ammonium lactate. An example of an intended formulation is ethylene glycol, ammonium formate, formamide and water. An alternative electrolyte is disclosed in U.S. Pat. No. 4,373,177 which utilizes an electrolyte system of mono(di-N-propylammonium)adipate or mono(di-isopropylammonium)adipate as a solute, phosphate salt, and water dissolved in ethylene glycol as a solvent. This is similar to the electrolyte system of U.S. Pat. No. 4,376,713 in which the electrolyte consists of mono-diethylammonium or mono-triethylammonium adipate as a solute, prepared by reacting diethylamine or triethylamine with adipic acid in ethylene glycol.

Another electrolyte system is discussed in U.S. Pat. No. 3,812,039. This patent teaches an electrolyte consisting essentially of an N-methylformamide solvent and at least 1% by weight of an acid maleate solute that consists in turn of equimolar amounts of maleic acid with ammonia, amine or alkali metal. Another approach is illustrated by U.K. patent application No. 2,041,646 which discloses a non-aqueous electrolyte comprising a cis isomer of an assymetrical unsaturated fatty acid molecule and certain salts thereof.

Japanese publication No. 47-29424 discloses an electrolyte for an electrolytic capacitor containing salts of formic acid and adipic acid in combination with ethylene glycol. However, this reference does not teach the use of formic acid and adipic acid in combination. Furthermore, an amino alcohol is also present in the disclosed composition.

U.S. Pat. No. 3,547,423 discloses capacitor electrolytes comprising an organic base of a substituted ammonia compound in an organic acid. This patent is similar to the Japanese reference in that it contemplates the use of alkanolamine salts of organic acids, including adipic acid and formic acid in electrolyte compositions.

SUMMARY OF THE INVENTION

In a composition aspect, this invention relates to electrolytes for electrolytic capacitors. These comprise an alkyl glycol of 2 to 4 carbons; ammonium formate; and either a dicarboxylic acid of 2 to 8 carbons or its diammonium salt, wherein the ammonium ion is of the formula $NH-(R)_3$ in which R is H, or alkyl or alkanol of 1 to 7 carbons.

In a further composition aspect, the electrolytes of the present invention further comprise ethylene glycol; ammonium formate; and a stabilizing amount of a carboxylic acid salt or its diammonium salt of the above formula.

In a more detailed aspect of the present invention, the electrolyte may comprise 2 to 8 weight percent of ammonium formate, 5 to 12 weight percent of a diammonium carboxylic acid salt, and the balance of ethylene glycol. Another formulation may comprise 15 to 20 weight percent of ammonium formate, 1 to 5 weight percent of a dicarboxylic acid, and the balance of ethylene glycol.

In a further aspect of the present invention, the electrolytes described above have a water content of less than about 0.3 weight percent.

DETAILED DESCRIPTION OF THE PREFERRED EMBODIMENTS

The electrolyte compositions of the present invention are useful in electrolytic capacitors subjected to continuous operation, and for use over a broad temperature range and at elevated operating temperatures.

The compositions of the present invention include (1) an alkyl glycol of 2 to 4 carbons; (2) ammonium formate; and (3) either a dicarboxylic acid of 2 to 8 carbons, which can contain monoolefinic unsaturation, or its diammonium salt wherein the ammonium ion is of the formula $NH-(R)_3$ in which R is H, or alkyl or alkanol of 1 to 7 carbons.

In the generic formulation given above, examples of the alkyl glycol include ethylene, propylene, and trimethylene glycol and those isomeric glycols formed from the butenes. Examples of the dicarboxylic acids include malonic, succinic, maleic, fumaric, adipic and suberic acids, and examples of their diammonium salts include diammonium maleate and diammonium adipate. Examples of other ammonium ions include diethylammonium, triethylammonium and ethanolammonium.

Certain acids and diammonium salts are preferred because they are readily available or modified, and are economically obtained. For example, maleic and fumaric acids are commonly utilized in food production, and adipic acid is quantitatively utilized for the production of nylon.

In this invention, a preferred solvent is ethylene glycol. Because water in an electrolyte is found to be detrimental to the shelf-life of the capacitor, an advantage of the compositions of the invention is that the water content of the electrolyte is very low. The water content of the compositions of the present invention is less than or equal to about 0.3 weight percent. This means that the common practice of formulating an electrolyte by dissolving an organic acid in the solvent and neutralizing it by adding a base is not possible because of the water formed as a product of the reaction.

Consequently, only salts which have been synthesized and dried in advance may be used. Most of the common inorganic salts are excluded from the electrolyte compositions of the present invention because they attack aluminum or the aluminum oxide dielectric surface layers.

The smallest, and thus more rapidly moving, of the readily available organic salts is ammonium formate. Ammonium formate provides for superior conductivity in ethylene glycol, but by itself is restricted to low voltage units since it breaks down when placed under excessive electrical stress. Another difficulty with ammonium formate is that it is decomposed by high temperatures, releasing ammonia gas. These problems have been approached in two ways; by stabilizing the formate or counteracting released ammonia.

Generally, also, an electrolyte's resistivity should be higher for high voltage units. This enhances the stability and operating life of the capacitor. Increased resistivity may be achieved by decreasing the ammonium formate concentration, thereby decreasing net charge transfer; or by maintaining an increased ammonium formate concentration by adding a stabilizing agent, which is also likely to raise the resistivity of the resulting electrolyte.

Several organic compounds are effective stabilizers. A preferred agent for higher resistivity electrolytes is diammonium adipate. Again, the salt must be used to avoid contaminating the electrolyte with water. Although the adipate was chosen, similar stabilization occurs with the salts of maleic acid, fumaric acid, suberic acid and others. In fact, the higher ammonium ions (diethylammonium, triethylammonium, ethanolammonium, etc.) seem to be even more stabilizing, but lead to higher resistivities for the electrolyte. Acids, such as maleic, are preferred for the lower resistivity electrolyte. A balance must also be reached between adding more ammonium formate to counteract a stabilizer which raises the resulting resistivity, and using less ammonium formate and less stabilizer.

The difficulty with the decomposition of ammonium formate at elevated temperatures can be counteracted readily. The simplest way is to use less ammonium formate. As the solution moves away from saturation, the problem is lessened. The second way is to prevent the escape of ammonia by sealing the unit hermetically. Capacitors are routinely produced in this manner, so that only in units made with the most concentrated ammonium formate solutions is the release of ammonia a problem. For these units, the addition of an acid which forms a more stable ammonium salt will work. Again, any of the common acids such as adipic, maleic, fumaric, or suberic can be used. Since only a small portion of the acid will be reacted with the ammonia, only a minimal amount of water is formed and deleterious effect is not produced.

The compounds of the present invention generally can be prepared by dissolving, by stirring or agitating, 2 to 8 weight percent, preferably 3 to 5 weight percent, of ammonium formate and 5 to 12 weight percent, preferably 7 to 8 weight percent, of a diammonium dicarboxylic acid salt in an alkyl glycol. The procedure should be conducted at a temperature below 50° C., preferably 20° C. to 40° C.

Other formulations incorporating an acid instead of a diammonium salt can be prepared by dissolving in an alkyl glycol, 15 to 20 weight percent, preferably 18 to 20 weight percent, and most preferably about 20 weight percent of ammonium formate, and 1 to 5 weight percent, preferably about 1 weight percent of a dicarboxylic acid. Lower concentrations of acid are preferred because acids may tend to degrade the electrodes' surface oxide layers.

The choice of most appropriate amounts of these ingredients is guided by the operating requirements of a given capacitor. For example, an industry standard capacitor is designed to operate effectively over a temperature range of −40° C. to 85° C. However, some capacitors are utilized at the lower end of this temperature spectrum, where ESR is particularly critical.

Thus, a balance must be achieved between adding ammonium formate as an ionogen, which exhibits increased resistivity at its lower and higher concentration ranges and decreased stability at higher operating voltages, and a stabilizing agent such as ammonium adipate, which also may increase resistivity. Therefore, the preferred weight percent of these components depends upon the capacitor's ultimate operating parameters.

From the foregoing description, one skilled in the art can easily ascertain the essential characteristics of this invention, and without departing from the spirit and scope thereof, can make various changes and modifications to the electrolytic capacitor electrolyte compositions of the present invention so as to adapt them to various other usages and conditions. The following preferred specific embodiments are, therefore, to be construed as merely illustrative and not limitative of the disclosure in any way whatsoever.

EXAMPLE 1

A low resistivity electrolyte solution is prepared as follows: In 42.3 Kg of dry (less than 0.3% water) reagent grade ethylene glycol (about 680 moles and 87 wt.%), dissolve while stirring, 1.92 Kg of certified (greater than 97% pure) ammonium formate (about 30.5 moles and 4 wt.%) and 4.3 Kg of reagent grade diammonium adipate (about 29.4 moles and 9 wt.%). The preparation should be maintained below 50° C., preferably about 25° C. This produces an electrolyte solution with a resistivity of 180 ohm-cm.

EXAMPLE 2

To 10 Kg of dry (less than 0.3% water) reagent grade ethylene glycol (about 160 moles and 79 wt.%), add while stirring 2.5 Kg of ammonium formate (about 40 moles and 20 wt.%) and 0.20 Kg of maleic acid (about 1.7 moles and 1 wt.%). Dissolve the solute at a temperature below 50° C., preferably 25° C. This formulation results in an electrolyte solution having a resistivity of 80 ohm-cm and extended operating life at elevated temperatures or under prolonged operation conditions.

Table 1 illustrates the advantageous long-term (i.e., 2000 hours) stability and low ESR properties of the formulations of Examples I and II, as compared with conventional electrolytic capacitor electrolytes (A and B).

TABLE 1

| Capacitor Unit | Electrolyte | Operating time in hours at 85° C. and 6.3 volts | Capacitance(μF) | ESR(ohms) |
|---|---|---|---|---|
| RD-1040 | A[1] | 100 | 780 | 0.331 |
|  |  | 500 | 770 | 0.301 |
|  |  | 1000 | 770 | 0.318 |
|  |  | 2000 | 760 | 0.307 |
|  | B[2] | 100 | 790 | 0.104 |
|  |  | 500 | 780 | 0.112 |
|  |  | 1000 | 780 | 0.129 |
|  |  | 2000 | 770 | 0.180 |
|  | Ex. I | 100 | 805 | 0.118 |
|  |  | 500 | 790 | 0.134 |
|  |  | 1000 | 780 | 0.139 |
|  |  | 2000 | 760 | 0.146 |
|  | Ex. II | 100 | 760 | 0.174 |
|  |  | 500 | 750 | 0.229 |
| RD-928 | B[2] | 100 | 700 | 0.106 |
|  |  | 500 | 700 | 0.100 |
|  |  | 1000 | 695 | 0.114 |
|  |  | 2000 | 660 | 0.301 |
|  | Ex. I | 100 | 740 | 0.146 |
|  |  | 500 | 720 | 0.158 |
|  |  | 1000 | 710 | 0.173 |
|  |  | 2000 | 700 | 0.178 |

[1] 131 moles ethylene glycol, 5.8 moles ammonium pentaborate octa-hydrate, 0.86 moles ammonium dihydrogen phosphate, and 10.5 moles of deionized water
[2] 100.5 moles of dimethyl formamide, 4.8 moles ethylene glycol, 4.8 moles boric acid, 6.9 moles maleic acid, 7.4 moles triethylamine, 0.6 moles anhydrous ammonia, and 0.05 moles tungstophosphoric acid.

What is claimed is:

1. An electrolyte for an electrolytic capacitor, comprising:
   about 2 to 20 weight percent of ammonium formate;
   about 1 to 12 weight percent of a dicarboxylic acid of 2 to 8 carbons or its diammonium salt, wherein the ammonium ion is of the formula NH—(R)$_3$ in which R is H, alkyl of 1 to 7 carbons or alkanol of 1 to 7 carbons;
   the balance being an alkyl glycol of 2 to 4 carbons.

2. The electrolyte of claim 1, wherein said ammonium formate constitutes about 2 to 20 weight percent, and said dicarboxylic acid or its diammonium salt constitutes about 1 to 12 weight percent.

3. The electrolyte of claim 2, wherein said ammonium formate constitutes about 2 to 8 weight percent, said diammonium carboxylic acid salt constitutes about 5 to 12 weight percent, and said alkyl glycol is ethylene glycol.

4. The electrolyte of claim 3, wherein said diammonium carboxylic acid salt is diammonium adipate.

5. The electrolyte of claim 2, wherein said ammonium formate constitutes about 15 to 20 weight percent, said dicarboxylic acid constitutes about 1 to 5 weight percent, and said alkyl glycol is ethylene glycol.

6. The electrolyte of claim 5, wherein said dicarboxylic acid is maleic acid.

7. The electrolyte of claim 1, wherein at least one of R is not H.

8. An electrolyte for an electrolytic capacitor consisting essentially of about 2 to 8 weight percent of ammonium formate, about 5 to 12 weight percent of a diammonium carboxylic acid salt of 2 to 8 carbons wherein the ammonium ion is of the formula NH—(R)$_3$ in which R is H, alkyl of 1 to 7 carbons, or alkanol of 1 to 7 carbons, and the balance of ethylene glycol, with a maximum electrolyte content of about 0.3 weight percent water.

9. The electrolyte of claim 8, wherein said ammonium formate constitutes about 4 weight percent, and said diammonium carboxylic acid salt constitutes about 9 weight percent of diammonium adipate.

10. An electrolyte for an electrolytic capacitor consisting essentially of about 15 to 20 weight percent of ammonium formate, about 1 to 5 weight percent of a dicarboxylic acid of 2 to 8 carbon atoms, and the balance of ethylene glycol, with a maximum electrolytic content of about 0.3 weight percent water.

11. The electrolyte of claim 10, wherein said ammonium formate constitutes about 20 weight percent, and said dicarboxylic acid constitutes about 1 weight percent of maleic acid.

* * * * *